United States Patent [19]

Dotter, Jr.

[11] 4,237,345

[45] Dec. 2, 1980

[54] TRANSFORMER WITH INTEGRAL REED CONTACT

[75] Inventor: Berton E. Dotter Jr., Belmont, Calif.

[73] Assignee: TRW Inc., Los Angeles, Calif.

[21] Appl. No.: 3,280

[22] Filed: Jan. 15, 1979

[51] Int. Cl.[3] .................. H01H 51/00; H04M 3/22

[52] U.S. Cl. .................. 179/16 E; 179/18 F; 335/151; 335/281

[58] Field of Search .................. 335/151, 177, 281, 154; 179/18 F, 18 FA, 16 E, 16 EA, 158 R

[56] References Cited

U.S. PATENT DOCUMENTS

| | | | |
|---|---|---|---|
| 2,992,306 | 7/1961 | Feiner | 335/151 |
| 2,995,637 | 8/1961 | Feiner et al. | 335/281 |
| 3,142,734 | 7/1964 | Bianco et al. | 335/154 |
| 3,214,522 | 10/1965 | Sundberg et al. | 179/16 E |
| 3,256,404 | 6/1966 | Newman et al. | 335/151 |
| 3,492,613 | 1/1970 | Van Husen | 335/151 |
| 3,560,804 | 2/1971 | Goossens et al. | 179/70 |
| 3,781,483 | 12/1973 | Deisch | 179/18 F |

*Primary Examiner*—Bernard Konick
*Assistant Examiner*—Randall P. Myers
*Attorney, Agent, or Firm*—Flehr, Hohbach, Test, Albritton & Herbert

[57] ABSTRACT

A magnetically operated switch especially useful in telephone applications includes a transformer having a plurality of windings on an E-frame core and a reed switch magnetically coupled to the core by a plurality of high permeability strips which are placed in juxtaposition with the core and which have rolled end portions for supportably receiving the reed switch. The switch may be used in a hybrid junction for dial pulse detection.

4 Claims, 3 Drawing Figures

TRANSFORMER WITH INTEGRAL REED CONTACT

This invention relates generally to telephone signalling systems, and more particularly the invention relates to a magnetically operated switch and a dial pulse detecting circuit employing the magnetically operated switch.

Automated telephone dialing systems are often controlled from telephone rotary dials which work on the basis of interrupting a current path through pulsing relays. Because of the lines used in a telephone system are often exposed to large currents induced from natural phenomena such as lightning storms, for example, rugged circuits are mandatory for reliable operation. With the advent of electronic telephone systems, solid state circuits have been devised for the purpose of detecting the current pulses from the rotary dial of a telephone instrument. Usually these dials pulsed detectors include many components which serve to provide electrical protection from the sporadic, large induced currents. Additionally, electronic dial pulse detectors often interface with high voltages used to supply power to the telephone system. Thus, these electronic dial pulse detectors include many components which serve to provide electrical protection from the sporadic, induced large currents and overvoltages.

The pulsing relay in a well known method of providing rugged and dependable dial pulse detection. However, such relays require frequent contact adjustment in order to function properly. The reed switch is a well known device having rugged properties but use of such switches in dial pulse detection has heretofore required a compromise in transformer construction in order to magnetically actuate the reed switch.

An object of the present invention is an improved circuit for detecting dial pulses in a telephone system.

Another object of the invention is a dial pulse detecting circuit employing a magnetically operated reed switch.

Still another object of the invention is an improved magnetically operated switch.

Briefly, in accordance with the invention, circuit for detecting dial pulses in a telephone system includes a transformer having a plurality of windings and a core on which the windings are mounted and magnetically coupled, a magnetically operated reed switch, and means for mounting and magnetically coupling the reed switch to the core whereby the reed switch operably responds to dial pulses. The means for mounting and magnetically coupling the reed switch to the transformer includes a plurality of strips of magnetic material with the strips being placed in juxtaposition with the core for communicating magnetic flux from the core to the reed switch. Advantageously, the transformer can be designed for optimum signal coupling without provision for an air gap of unique spacing or the removal of transformer core laminations in order to facilitate magnetic coupling of the reed switch.

The invention and objects and features thereof will be more readily apparent from the following detailed description and appended claims when taken with the drawing.

Figure 1:
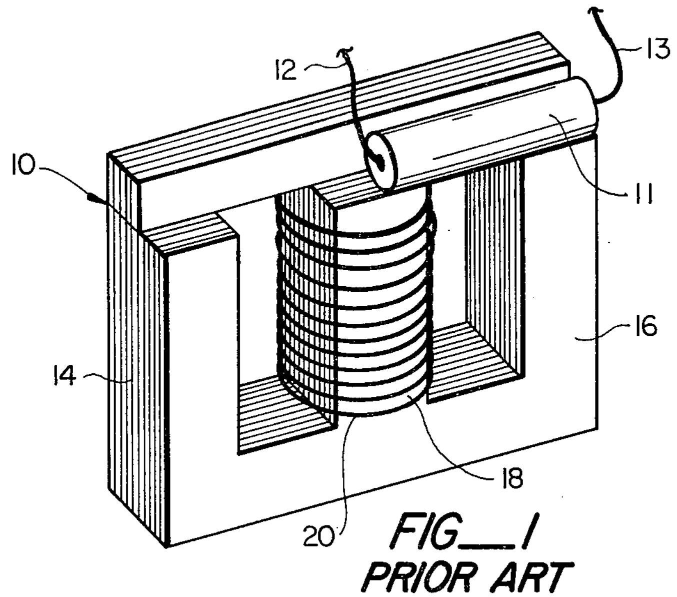
FIG 1 PRIOR ART
FIG. 1 is a perspective view of a prior art transformer and reed switch.

The use of a reed switch in combination with a transformer is heretofore known. However, design limitations of such structures have not been compatible with use in a telephone system application where signal coupling characteristics are paramount. FIG. 1 is a perspective view illustrating a transformer 10 designed to accommodate a reed switch 11 in accordance with the prior art. The reed switch has leads 12 and 13. As illustrated, the core of the transformer is of the designated E type including two outer legs 14 and 16 with a middle leg 18 around which the transformer windings shown generally at 20 are wound. The core typically comprises a laminated structure of magnetic plates. As noted, a portion of the transformer core is removed to accommodate the reed switch 11 thereby defining an air gap and air space for coupling magnetic flux of the core to the reed switch 11. Due to the low permeability of air, the coupling of magnetic flux to the reed switch is inefficient thus necessitating significant flux leakage and resulting in non-optinum transformer design for signal coupling functions. This limitation is particularly significant in telephone system applications.

Figure 2:
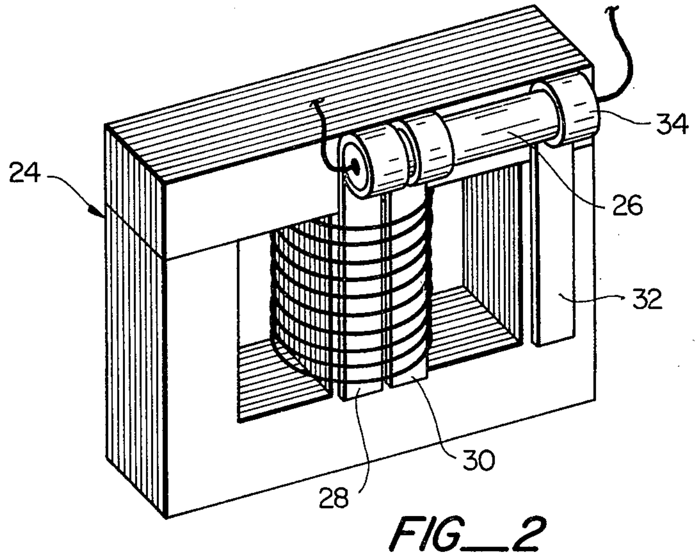
FIG. 2 is a perspective view of one embodiment of a transformer and integral reed switch in accordance with the present invention.

Referring now to FIG. 2, a perspective view of a transformer 24 and reed switch integrally mounted therewith in accordance with the present invention is illustrated. A plurality of magnetic strips 28, 30, and 32 are placed in juxtaposition with the magnetic core of transformer 24 with the two strips 28 and 30 abutting the middle arm of the E frame and strip 32 abutting an outer arm of the E frame for magnetic coupling. One end of each of the strips is rolled as shown at 34 for strip 32 whereby the reed switch 26 is supported therein. The strips are affixed to the outer surface of the core by means of a lacquer or other suitable adhesive.

Advantageously, the transformer core and winding can be optimally designed for signal coupling without design compromise for accommodating the reed switch. It has been discovered that more than adequate magnetic coupling can be effected through use of the magnetic strips. The amount of magnetic coupling to the reed switch is established by positioning the magnetic strips such as 28 and 30 on the inner arm of the transformer core with less magnetic coupling being achieved by placing the strips 28 and 30 at the edge of the arm or by strip 30. The strips are preferably made of a high permeability magnetic material for maximum coupling.

Figure 3:
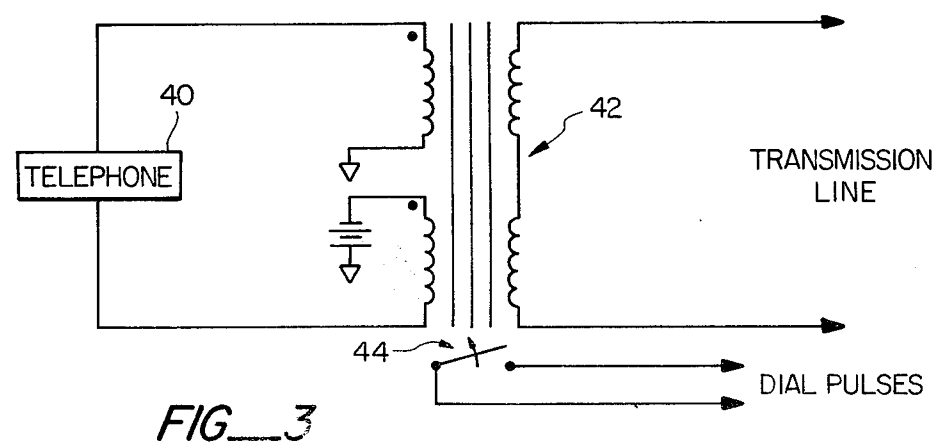
FIG. 3 is an electrical schematic illustrating a pulse detection circuit in accordance with the present invention.

A transformer and integral reed switch in accordance with the invention and as illustrated in FIG. 2 can be advantageously employed in a telephone system application, such as a conventional hybrid junction for two wire-four wire conversion or a two-wire dial pulse detection circuit. FIG. 3 is an electrical schematic of such a dial pulse detection circuit in which a telephone set shown generally at 40 is coupled to a transmission line by means of the transformer shown generally at 42. DC current in the transmission line flows through the transformer windings and is coupled to the telephone instrument 40. This DC current flows through the contacts in the telephone set which can be mechanically operated by the rotary dial action. Operating the rotary dial interrupts the DC current resulting in magnetic flux in the transformer due to interruption of the DC current in the windings. The magnetic flux is coupled to the reed switch shown generally at 44 thereby opening and closing the reed switch contact which may be connected to an electronic circuit for the purpose of repeating the dial pulse information from the telephone set to the telephone signalling system. By so employing a reed switch the need for periodic adjustment of switch contacts is obviated thus resulting in more reliable, maintenance free telephone equipment. While the invention has been described with reference to specific embodiments, the description is illustrative of the invention and is not to be construed as limiting the invention. An E-I type transformer core structure is shown in illustrative embodiment, but the invention has applicability to other transformer core structures which require an air gap. Thus, various modifications and applications may occur to those skilled in the art without departing from the true spirit and scope of the invention as defined by the appended claims.

What is claimed is:

1. In a telephone system including a transmission line and a transmitter receiver, a circuit for detecting dial pulses comprising a transformer having a plurality of windings and a core on which said windings are mounted and magnetically coupled, means connecting the transmission line to a winding, means connecting the transmitter receiver to a winding, a magnetically operated reed switch, and means for mounting and magnetically coupling said reed switch to said core whereby said reed switch operably responds to said dial pulses, said means for mounting and magnetically coupling said reed switch comprising a plurality of planar strips of magnetic material, said planar strips being adjustably positioned in juxtaposition with said core for variably coupling magnetic flux from said core to said reed switch, each of said strips including a rolled end portion for supportably receiving said reed switch.

2. A circuit for detecting dial pulses as defined by claim 1 wherein said core comprises a plurality of E laminates having at least two outer legs and one inner leg, one of said strips being placed in juxtaposition with an outer leg of said E laminates and at least one of said strips being placed in juxtaposition with said center leg of said E laminates.

3. For use in a telephone system application, magnetically operated switch means comprising a transformer having a plurality of windings and a core on which said windings are mounted and magnetically coupled, a magnetically operated reed switch, a plurality of planar strips of magnetic material for mounting and magnetically coupling said reed switch to said core whereby said reed switch responds to magnetic flux within said core, said strip being adjustably positioned in juxtaposition with said core for variably coupling magnetic flux from said core to said reed switch and each of said strips includes a rolled end portion for supportably receiving said reed switch.

4. A magnetically operated switch means as defined by claim 3 wherein said core comprises a plurality of E laminates having at least two outer legs and one inner leg, one of said strips being placed in juxtaposition with an outer leg of said core and at least one of said strips placed in juxtaposition with said center leg of said core.

* * * * *